United States Patent
Herzi et al.

(10) Patent No.: US 9,734,015 B2
(45) Date of Patent: Aug. 15, 2017

(54) PRE-BOOT SELF-HEALING AND ADAPTIVE FAULT ISOLATION

(71) Applicant: Dell Products, L.P., Round Rock, TX (US)

(72) Inventors: Dirie N. Herzi, Leander, TX (US); Abeye Teshome, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 147 days.

(21) Appl. No.: 14/747,827

(22) Filed: Jun. 23, 2015

(65) Prior Publication Data

US 2016/0378602 A1 Dec. 29, 2016

(51) Int. Cl.
*G06F 11/00* (2006.01)
*G06F 11/14* (2006.01)
*G06F 9/44* (2006.01)
*G06F 11/22* (2006.01)

(52) U.S. Cl.
CPC ........ *G06F 11/1417* (2013.01); *G06F 9/4401* (2013.01); *G06F 11/2284* (2013.01); *G06F 2201/805* (2013.01); *G06F 2201/85* (2013.01)

(58) Field of Classification Search
CPC ............. G06F 11/1417; G06F 11/2284; G06F 2011/2278; G06F 9/4401; G06F 9/4408; G06F 2201/805; G06F 2201/85
See application file for complete search history.

(56) References Cited

U.S. PATENT DOCUMENTS

| | | | | |
|---|---|---|---|---|
| 5,564,054 A * | 10/1996 | Bramnick | ............. | G06F 9/4411 713/2 |
| 5,634,137 A * | 5/1997 | Merkin | ................. | G06F 9/4401 710/10 |
| 5,974,546 A * | 10/1999 | Anderson | ........... | G06F 11/2284 713/2 |
| 6,272,626 B1 * | 8/2001 | Cobbett | ............. | G06F 11/1417 713/100 |
| 6,567,912 B1 * | 5/2003 | Belkin | ................. | G06F 9/4411 710/10 |
| 6,718,461 B1 * | 4/2004 | Ewertz | ................. | G06F 9/4401 710/10 |
| 8,504,814 B2 * | 8/2013 | Murray | ................. | H04L 63/123 713/2 |
| 2003/0084278 A1 * | 5/2003 | Cromer | ................ | G06F 9/4406 713/2 |
| 2004/0064761 A1 * | 4/2004 | Harrington | ......... | G06F 11/1417 714/43 |
| 2004/0255179 A1 * | 12/2004 | Mayer | .................. | G06F 9/4406 714/1 |

(Continued)

*Primary Examiner* — Marc Duncan
(74) *Attorney, Agent, or Firm* — Fogarty LLP

(57) ABSTRACT

Systems and methods for providing pre-boot providing pre-boot self-healing and adaptive fault isolation. In some embodiments, an Information Handling System (IHS) includes a processor and a Basic I/O System (BIOS) coupled to the processor, the BIOS firmware having program instructions that, upon execution by the processor, cause the IHS to: initiate the booting of devices within the IHS following a predetermined boot order, wherein the predetermined boot order includes a first device followed by a second device; determine that the first device has been marked for bypass; bypass the booting of the first device; and boot the second device.

18 Claims, 3 Drawing Sheets

(56) References Cited

U.S. PATENT DOCUMENTS

| | | | | |
|---|---|---|---|---|
| 2006/0143431 A1* | 6/2006 | Rothman | ............ | G06F 11/1417 |
| | | | | 713/2 |
| 2006/0294353 A1* | 12/2006 | Rothman | ............ | G06F 11/0766 |
| | | | | 713/1 |
| 2007/0255934 A1* | 11/2007 | Dennis | ................ | G06F 11/1417 |
| | | | | 713/1 |
| 2008/0301424 A1* | 12/2008 | Barajas | ............... | G06F 11/1417 |
| | | | | 713/2 |
| 2011/0145923 A1* | 6/2011 | Largman | ............. | G06F 11/1456 |
| | | | | 726/24 |
| 2013/0227356 A1* | 8/2013 | Kim | .................... | G06F 11/1417 |
| | | | | 714/48 |
| 2014/0298091 A1* | 10/2014 | Carlen | .................... | H04L 65/80 |
| | | | | 714/15 |
| 2015/0067311 A1* | 3/2015 | Forristal | ............. | G06F 11/1433 |
| | | | | 713/2 |
| 2016/0124753 A1* | 5/2016 | Tsirkin | .................. | G06F 9/4408 |
| | | | | 713/2 |

* cited by examiner

PRE-BOOT SELF-HEALING AND ADAPTIVE FAULT ISOLATION

FIELD

This disclosure relates generally to computer systems, and more specifically, to systems and methods for providing pre-boot self-healing and adaptive fault isolation.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In many situations, an IHS may need to be serviced or supported. For example, the IHS may have hardware and/or software that needs to be fixed, updated, removed, installed, or replaced from time to time. To address these, and other problems, certain systems and methods described herein may enable a computer manufacturer or service provider to allow customers to have access to automated, simplified support actions or operations, for example, even when an IHS is not otherwise able to boot to an Operating System (OS) or has other serious hardware or software failures.

SUMMARY

Embodiments of systems and methods for providing pre-boot self-healing and adaptive fault isolation are described herein. In an illustrative, non-limiting embodiment, an Information Handling System (IHS) may include: a processor and a Basic I/O System (BIOS) coupled to the processor, the BIOS having program instructions that, upon execution by the processor, cause the IHS to: initiate the booting of devices within the IHS following a predetermined boot order, wherein the predetermined boot order includes a first device followed by a second device; determine that the first device has been marked for bypass; bypass the booting of the first device; and boot the second device.

In various implementations, the first device may include a Universal Serial Bus (USB) device, a Peripheral Component Interconnect (PCI) device, a Hard Disk Drive (HDD), or a Network Interface Card (NIC). The first device may have been marked for bypass by the BIOS due to a previous attempt to boot the first device resulting in a failure. For example, the previous attempt to boot the first device may include a failed firmware initialization operation for the first device. Additionally or alternatively, the previous attempt to boot the first device may include a failed device configuration operation for the first device.

The program instructions may further cause the IHS to: store a configuration setting for a first device that results in a successful boot; flag the first device in response to the configuration setting being modified, and in response to the first device failing to boot after the modification, restore the original configuration setting without input from any user. The flagging of the device may occur, for instance, in response to the configuration setting being modified by a user within an Operating System (OS) environment.

The program instructions, may further cause the IHS to: tag the first device as a malfunctioning device in response to a successful boot of subsequent devices; identify a Field Replaceable Unit (FRU) associated with the first device; and provide an indication of the FRU to a support service. Additionally or alternatively, the program instructions may further cause the IHS to store a first boot order of the devices that results in a successful boot, and in response to the predetermined boot order resulting in a no-boot condition, restore the first boot order without input from any user. Also, the program instructions, upon execution by the processor, may further cause the IHS to associate a strike count with the devices, the strike count for each device representing a number of previous boot failures associated with that device.

In some cases, IHS may make the strike count available to a primary Operating System. Additionally or alternatively, the IHS may make the strike count available to a service Operating System.

In another illustrative, non-limiting embodiment, a method may include determining, by a BIOS without any input from any user, that a given device in a boot order of an IHS has been marked for bypass as result of a previous, failed boot attempt, bypassing the given device in a current boot attempt, and in response to the current boot attempt being successful, tagging the given device as a potentially malfunctioning device.

In yet another illustrative, non-limiting embodiment, a BIOS may have program instructions stored thereon that, upon execution by an IHS, cause the IHS to: determine that a device in a boot order of the IHS has been marked for bypass as result of a previous, failed boot attempt, bypassing the device in a boot attempt, and in response to the boot attempt being successful, tag the given device as a potentially malfunctioning device.

In some embodiments, one or more of the techniques described herein may be performed, at least in part, by an IHS operated by a user. Additionally or alternatively, the techniques described herein may be performed, at least in part, by a Basic I/O System (BIOS) within an IHS. Additionally or alternatively, a non-transitory computer-readable medium or memory device may have program instructions stored thereon that, upon execution, enable an IHS to perform one or more of the techniques described herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
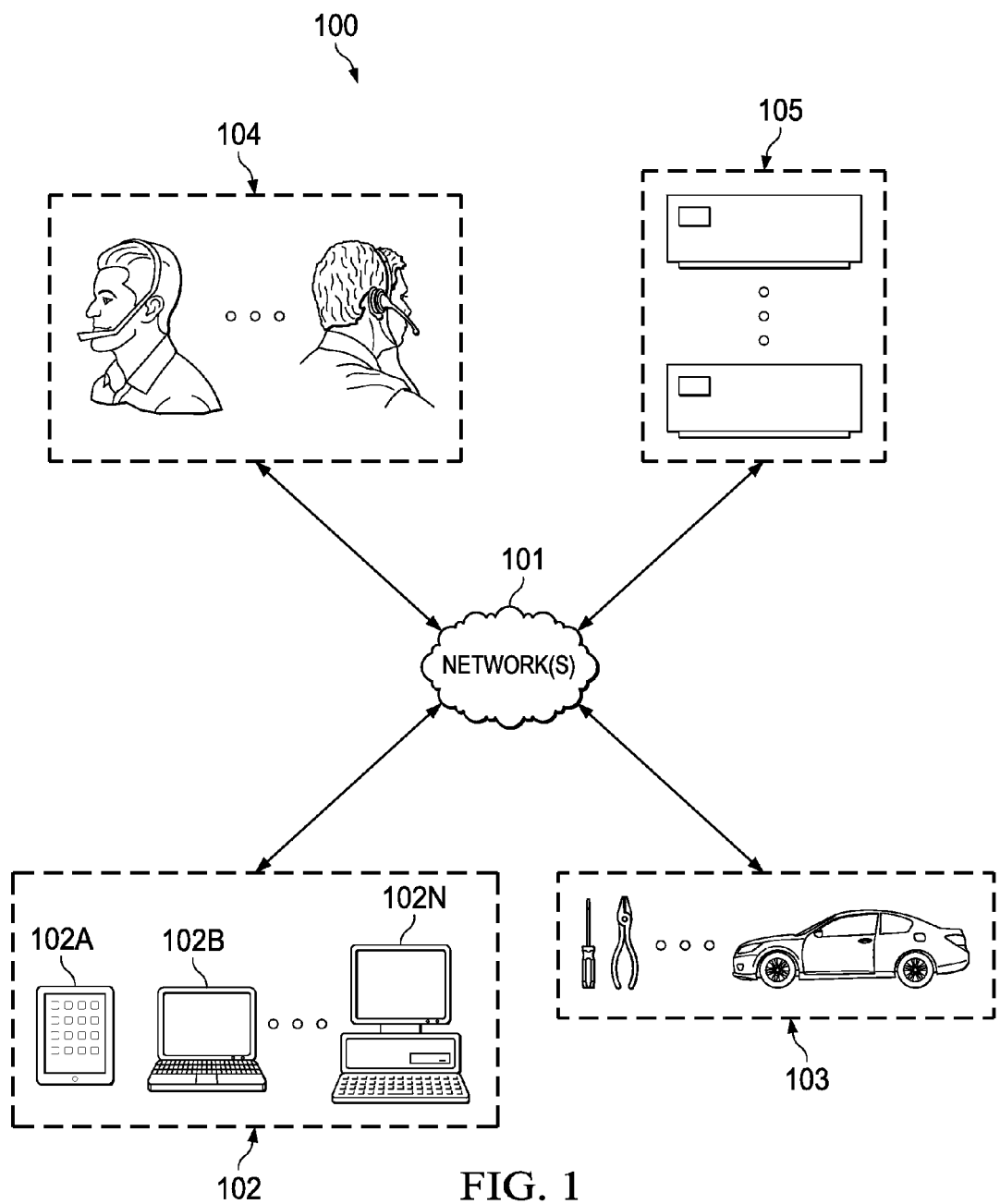
FIG. 1 is a diagram illustrating an example of an environment where systems and methods for providing service and support to computing devices may be implemented according to some embodiments.

To facilitate explanation of the various systems and methods discussed herein, the following description has been split into sections. It should be noted, however, that the various sections, headings, and subheadings used herein are for organizational purposes only, and are not meant to limit or otherwise modify the scope of the description or the claims.

A. Overview

The inventors hereof have recognized a need for providing systems and methods for service and support to computing devices. Existing tools intended to facilitate service and/or support of a client device or Information Handling System (IHS) do not adequately address numerous problems, such as, for example, situations when the IHS fails to boot a main or primary Operating System (OS) for any reason, whether due to a hardware or software problem, such that the IHS is said to be in a "degraded state." To address these and other concerns, embodiments described herein provide Embedded Controller (EC), Basic I/O System (BIOS), and/or service OS-level intelligence to enable a client device to self-diagnose and to receive automated service and support. Scenarios where the IHS fails to boot any OS are also addressed. Additionally or alternatively, in some embodiments, the main or primary OS may be modified to implement one of more of the foregoing features.

The term "degraded state," as used herein, refers to the state of an IHS that is not capable of booting a main or primary OS (e.g., WINDOWS®, MAC OS®, LINUX®, etc.), either fully or partially (e.g., in WINDOWS®'s "safe mode" or the like). When operating in a degraded state, the IHS may still be able to execute BIOS instructions and/or a "service OS" (SOS). In more extreme or "catastrophic" situations, the IHS may not be able to boot a service OS and/or to properly execute BIOS instructions (e.g., in the event of a CPU failure), but yet the IHS' EC may be configured to perform a number or support operations described herein.

The term "BIOS," as used herein, refers to a type of firmware used during an IHS's booting process (e.g., power-on or reset). The BIOS initializes and tests an IHS' hardware components, and loads a boot loader or an OS from a memory device. The BIOS also provides an abstraction layer for the hardware which enables software executed by the IHS to interact with certain I/O devices such as keyboards, displays, etc. Incidentally, the Unified Extensible Firmware Interface (UEFI) was designed as a successor to BIOS to address certain technical issues. As a result, modern IHSs predominantly use UEFI firmware and the term "BIOS," as used herein, is intended also encompass UEFI firmware and future variations thereof.

The term "EC," as used herein, refers to a firmware controller or chipset (distinct from the BIOS) that has traditionally provided the IHS with legacy Super I/O functionality plus certain control features, including: a floppy disk controller, game port, infrared port, intrusion detection, keyboard and mouse interface, parallel port, real-time clock, serial port, temperature sensor and fan speed, and a number of general-purpose input/output (GPIO) pins. In various embodiments described herein, an EC may be outfitted with instructions that enable it to perform non-conventional operations such as, for example, implement a network stack and/or identify defective Field Replaceable Units (FRUs).

The term "service OS," as used herein, refers to one or more program instructions or scripts distinct from an IHS's "main OS" or "primary OS" such that, upon execution by an IHS (e.g., upon failure by the IHS to load the main or primary OS), enable one or more support, diagnostics, or remediation operations to be performed independently of the state of the main or primary OS. The service OS may include one or more service and support applications, as described in more detail below. In some cases, an SOS may be stored in a recovery partition of a hard drive. Additionally or alternatively, an SOS may be stored in a Non-Volatile Memory (NVM) or flash memory built into the client system. Additionally or alternatively, the SOS may be stored in a remote location so as to allow an IHS to boot remotely "from the cloud."

As used herein, the terms "Field Replaceable Unit (FRU)" or "Customer Replaceable Unit (CRU)" include any IHS component, circuit board, card, part, or assembly that can be quickly and easily removed from the IHS and replaced by the user or customer (typically without much technical knowledge) without having to send the entire IHS to a repair facility. In some cases, FRUs may also allow a technician lacking in-depth product knowledge to isolate and replace faulty components. Examples of identifiable FRUs include, but are not limited to, CPU(s), BIOS, memory module(s), hard drive(s), video cards, the motherboard itself, etc.

In some embodiments, service capabilities may be invoked either "pre-boot" or "pre-OS." Pre-boot capabilities may be built into the EC and/or BIOS/UEFI, and pre-OS capabilities may be provided by a service OS. For example, pre-boot services may include enhanced EC routines configured diagnose certain IHS problems and to support a minimum degree of network communications. Additionally or alternatively, enhanced BIOS diagnostics tools may be also used to detect hardware failure, provide certain support services, etc. Conversely, pre-OS services may include enabling a service OS to provide customer automated assistance, using built-in remediation scripts to help diagnose and remediate the device, improve support efficiency using live chat, remote control support, etc.

In some implementations, pre-boot services may be focused on "no-boot" scenarios, whereas pre-OS services may be focused on operations such as remediation, boot from web, re-imaging from web, etc.

As will be understood by a person of ordinary skill in the art in light of this disclosure, virtually any IHS environment that requires service or support may implement one or more aspects of the systems and methods described herein. Furthermore, certain aspects of the connected systems described herein may be implemented by computer manufacturers, software providers, and/or service or support companies.

B. Service and Support Architecture

Turning now to FIG. 1, a diagram illustrating an example of an environment where systems and methods for providing service and support to computing devices may be implemented is depicted according to some embodiments. As shown, each of any number of client devices 102A-N may be an IHS or other computing device (generically referred to as "IHS 102," "client 102," "client device 102," or "device 102") including, for example, desktops, laptops, tablets, smartphones, and any other all-in-one (AIO) data processing device. In some situations, devices 102 may be located in geographically distributed or remote locations, such as offices, homes, etc. Each device 102 may be operated by an individual end-consumer (e.g., lay person) or customer of a computer manufacturer or software provider, for instance. In some cases, two or more of client devices 102A-N may be deployed within or managed by the same organization (e.g., a business).

Tools intended to facilitate service and/or support of client devices 102 include service technicians 103, live support operators 104, and/or backend service 105. Service technicians 103 include trained employees or contractors that can travel to the site of device 102 or that can receive the physical device 102 (e.g., at a retail store, by mail, etc.) or part(s) thereof in order to make repairs, for example. Live support operator(s) 104 may be available, for instance, when device 102 fails but it is sufficiently operational that it can still connect the user to operator(s) 104 via chat, email, text messages, Voice-Over-Internet Protocol (VoIP) call, etc. Additionally or alternatively, the user of client device 102 may place a conventional phone call to live support operator(s) 104 (e.g., using a 1-800 number or the like). In some cases, live support operator(s) 104 may interactively guide the user in an effort to correct problems with client device 102 (e.g., troubleshooting).

Backend service 105 may include one or more servers and/or IHSs configured to perform one or more automated operations with respect to device 102. In various implementations, backend service 105 may be configured to communicate with a service OS prior to and/or independently of IHS 102 being able to boot a main OS, and it may enable one or more support, diagnostics, or remediation operations to be performed remotely including, but not limited to, telemetry, error reporting, tracking, chat, etc.

Entities 102-105 may have access to network 101. In various embodiments, telecommunications network 101 may include one or more wireless networks, circuit-switched networks, packet-switched networks, or any combination thereof to enable communications between two or more of IHSs. For example, network 101 may include a Public Switched Telephone Network (PSTN), one or more cellular networks (e.g., third generation (3G), fourth generation (4G), or Long Term Evolution (LTE) wireless networks), satellite networks, computer or data networks (e.g., wireless networks, Wide Area Networks (WANs), metropolitan area networks (MANs), Local Area Networks (LANs), Virtual Private Networks (VPN), the Internet, etc.), or the like.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of NVMs.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
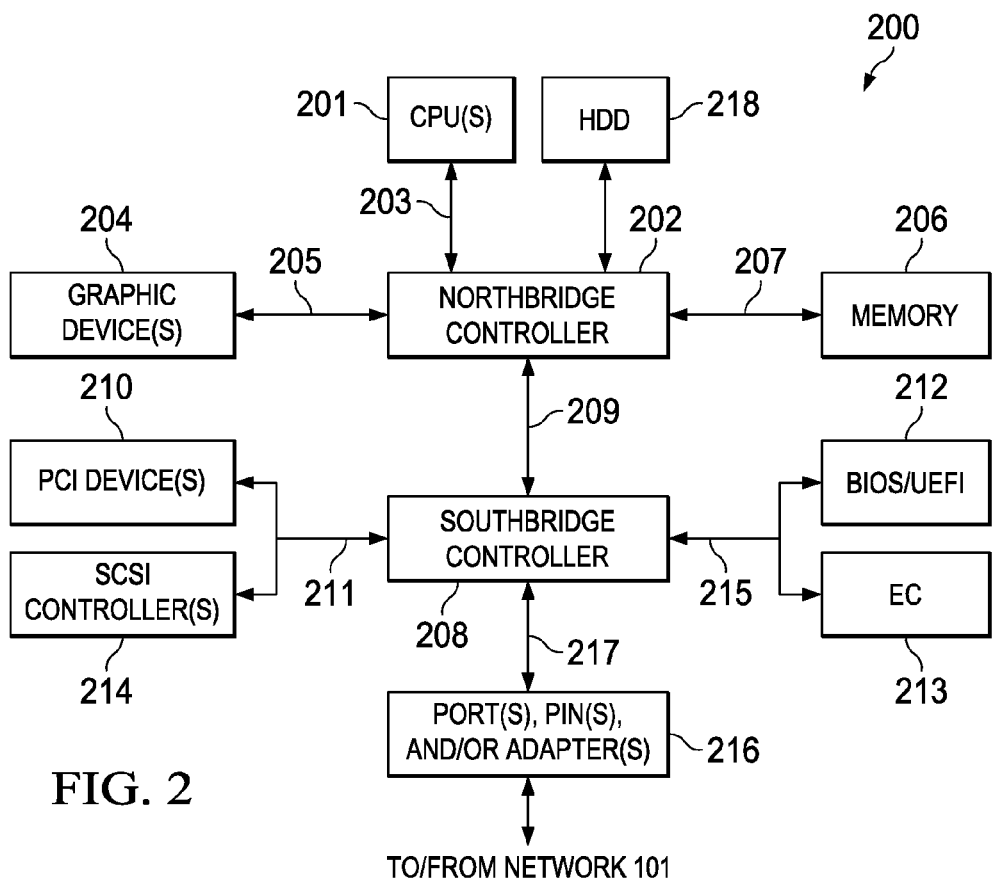
FIG. 2 is a block diagram of an example of an Information Handling System (IHS) according to some embodiments.

FIG. 2 is a block diagram of an example of an IHS. In some embodiments, IHS 200 may be used to implement any of computer systems or devices 102A-N and/or 105. Moreover, IHS 200 may include a number of components, several of which may be physically disposed on a motherboard (not shown) or other printed circuit board (PCB). For example, in various embodiments, IHS 200 may be a single-processor system including one CPU 201, or a multi-processor system including two or more CPUs 201 (e.g., two, four, eight, or any other suitable number). CPU(s) 201 may include any processor capable of executing program instructions. For example, in various embodiments, CPU(s) 201 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 201 may commonly, but not necessarily, implement the same ISA.

CPU(s) 201 are coupled to northbridge controller or chipset 201 via front-side bus 203. Northbridge controller 202 may be configured to coordinate I/O traffic between CPU(s) 201 and other components. For example, in this particular implementation, northbridge controller 202 is coupled to graphics device(s) 204 (e.g., one or more video cards or adaptors) via graphics bus 205 (e.g., an Accelerated Graphics Port or AGP bus, a Peripheral Component Interconnect or PCI bus, or the like). Northbridge controller 202 is also coupled to system memory 206 via memory bus 207, and to hard disk drive (HDD) 218. Memory 206 may be configured to store program instructions and/or data accessible by CPU(s) 201. In various embodiments, memory 206 may be implemented using any suitable memory technology, such as static RAM (SRAM), synchronous dynamic RAM (SDRAM), nonvolatile/Flash-type memory, or any other type of memory. Conversely, HDD 218 may include any magnetic, solid-state (SSD), or hybrid data storage device capable of storing an OS and other applications.

Northbridge controller 202 is coupled to southbridge controller or chipset 208 via internal bus 209. Generally speaking, southbridge controller 208 may be configured to handle various of IHS 200's I/O operations, and it may provide interfaces such as, for instance, Universal Serial Bus (USB), audio, serial, parallel, Ethernet, or the like via port(s), pin(s), and/or adapter(s) 216 over bus 217. For example, southbridge controller 208 may be configured to allow data to be exchanged between IHS 200 and other devices, such as other IHSs attached to a network (e.g., network 101). In various embodiments, southbridge controller 208 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 208 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 208 is further coupled to one or more PCI devices 210 (e.g., modems, network cards, sound cards, or video cards) and to one or more SCSI controllers 214 via parallel bus 211.

Southbridge controller 208 is also coupled to BIOS/UEFI 212 and to EC 213 via Low Pin Count (LPC) bus 215. BIOS/UEFI 212 includes non-volatile memory having program instructions stored thereon. Those instructions may be usable by CPU(s) 201 to initialize and test other hardware components and/or to load an OS onto IHS 200.

EC 213 combines interfaces for a variety of lower bandwidth or low data rate devices that are typically coupled to IHS 200. Such devices may include, for example, floppy disks, parallel ports, keyboard and mouse, temperature sensor and fan speed monitoring/control, among others. In various implementations, southbridge controller 208 may be configured to allow data to be exchanged between EC 213 (or BIOS/UEFI 212) and another IHS attached to network 101 (e.g., a remote server or other source of technical service) using wired or wireless capabilities of network interface adapter (NIC) 216.

In some cases, IHS 200 may be configured to provide access to different types of computer-accessible media separate from memory 206. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 202 and/or southbridge controller 208.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 202 may be combined with southbridge controller 208, and/or be at least partially incorporated into CPU(s) 201. In other implementations, one or more of the devices or components shown in FIG. 2 may be absent, or one or more other components may be added. Accordingly, systems and methods described herein may be implemented or executed with other IHS configurations.

In various embodiments, service and support capabilities may be built, at least in part, into a client device's EC 213 and/or BIOS/UEFI 212.

Figure 3:
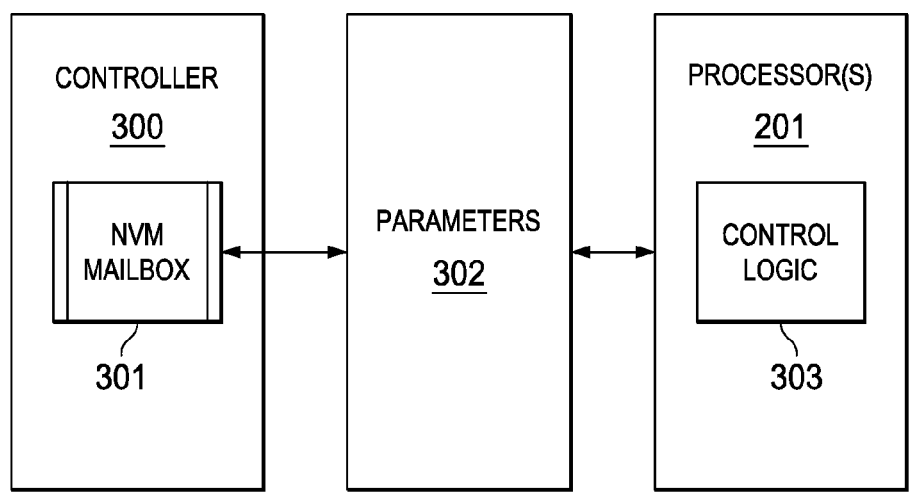
FIG. 3 is a block diagram of an example of a firmware controller according to some embodiments.

In that regard, FIG. 3 shows block diagram of an example of firmware 300 configured to implement EC 213 and/or BIOS/UEFI 212. Particularly, firmware 300 may include one or more diagnostics routines, as well as a network stack. Firmware 300 also includes NVM mailbox 301 configured to store program instructions that, upon execution, provide and/or receive one or more service and support parameters or information 302 to or from control logic 303 of CPU(s) 201 or a remote device (e.g., backend service 105) over network 101 in order to implement one or more service and support applications. In some cases NVM mailbox 301 may serve as a "mailbox" to track issues and other information persistently.

C. Service and Support Applications

In some embodiments, a variety of service and support applications may be embedded, at least in part, within BIOS/UEFI 212 and/or EC 213.

i. Pre-Boot Support and Field Replaceable Unit (FRU) Isolation

Currently, certain types of system failures can take a long time to diagnose. In those cases, conventional diagnostics processes can cause a high incident of "good" parts being inadvertently replaced, creating multiple service calls and FRU dispatches—an overall expensive and undesirable customer experience.

To address these, and other problems, systems and methods may enable remote diagnostics and access of an IHS without employing any software agent installed (or operating) in the IHS. In various embodiments, these systems and methods may rely upon intelligence built into the IHS's Embedded Controller or "EC"—which is in contrast with existing remote support or access techniques that rely upon a functioning OS environment.

Accordingly, these systems and methods may be particularly relevant, for example, in situations an IHS suffers from a catastrophic failure (e.g., CPU failures, no video scenarios, etc.). Techniques are provided that enable control, diagnostic, and/or remediation of a "dead" IHS for maintenance and/or break/fix scenarios, regardless of the operational state of the IHS. For example, in some cases, these systems and methods may provide remote and agentless access of dead/failed IHS attributes, remote and agentless setup and configuration control of an IHS, and an accessing device/entity (e.g., a smart mobile device) remotely running deterministic algorithm, as well as coalescence of local and remote deterministic algorithms for comprehensive coverage.

Moreover, various systems and methods may provide isolation of an IHS' failure to an FRU, which promotes a more optimal service experience. Techniques for identifying a FRU to exculpate, or replace, with a high degree of confidence regardless of the operational state of an IHS are provided to increase accuracy and to reduce time to resolution, and also overall user/technician contact. These techniques may include local FRU isolation process(es) that are EC-based, and therefore do not run on the IHS's main CPU. Even though such processes do not rely on the CPU, they may include IHS-initiated remote communication of FRU isolation results, for example, to backend service or technician.

ii. Pre-Boot Self-Healing and Adaptive Fault Isolation

Sometimes firmware, hardware, or configuration issues can lead "no boot" conditions. Historically, the BIOS was responsible to inform the user of the failure and to stop the boot process. The inventors hereof have determined, however, that in an IHS that includes resources such as a service OS, an OS recovery environment, embedded diagnostics, and/or "call home" capabilities, the halting of the boot process by the BIOS is not ideal.

To address these, and other problems, systems and methods may enable pre-boot self-healing in the BIOS. In various embodiments, these systems and methods may enable the BIOS to, upon identifying a no boot scenario, take actions such as: bypassing failing devices, Option ROMs (OPROMs), rolling back user configuration, and/or booting to an interactive recovery environment.

In various implementations, these systems and methods may employ a strike count for each module on the boot path (USB, PCIe, HDD, NIC, etc.), flag before and after device configuration steps to identify hangs, and/or store in non-volatile memory devices that have caused a hang on previous boot and bypass in current boot. These systems and methods may also save successful boot BIOS and device (HII) configurations to be restored incase of no boot, log all bypassed and rolled back configuration for a recovery environment, and/or disable as needed PCIe links, USB ports, external connections (e.g., docks, thunderbolt, type-C, etc.).

Moreover, systems and methods may also employ preservation of the fault environment, adaptive and deterministic analysis in a failed state, recognition of a fault, and/or real-time invocations of local or remote commands in the failed state. In various implementations, techniques are provided to coalesce adaptive and learning capabilities with failed environment preservation on an IHS outside of an OS. These techniques may employ OS-agnostic unattended fault learning capability in a failed system as well as OS-agnostic unattended sequential decision making in a failed system.

iii. Automated Fault Recovery

Existing IHS recovery techniques include OS recovery tools, virus scans, disk recovery, and other diagnostics. Currently, however, there is no automated way for an IHS select and launch a given one of these recovery tools that is most suitable to address a particular failure. To date, recovery procedures still require a user to understand the failure and associated fix tool.

To address these, and other problems, systems and methods described herein may enable automation of the tool selection and execution process, by the system BIOS, based upon the particular type of failure encountered by the IHS. In various embodiments, the BIOS may be notified of each fix tool and the types of failures each tool is intended to address.

Moreover, in some implementations, each recovery or diagnostic software tool may register its capabilities and associated OS faults or issues. The BIOS may be configured to detect boot up failures and/or delays in the boot process, and to launch appropriate tools based upon their registration information. The BIOS may also include a state machine for tools to take control of the boot process.

These, and other systems and methods, are explained in more detail in "Section E."

iv. Proactive Fault Avoidance

Generally, it is only after an IHS fault has been detected that any recovery action is initiated. By the time an IHS suffers a failure, however, its operational capability may already be severely degraded, impacting the IHS's ability to be diagnosed and negatively affecting the user's experience. Accordingly, the inventors hereof have determined that recognizing and interpreting indications leading to a failure can enable in proactive action which in turn can prevent or lessen the impact of system failure.

To address these, and other problems, systems and methods may enable proactive fault avoidance. In various embodiments, system telemetry may be resolved against normal operational boundaries using self-contained OS agnostic trending algorithms to predict system failures for proactively avoiding those failures. Examples of system telemetry data include, but are not limited to, voltage tree spanning, temperature, shock count, shock magnitude, humidity, pressure, charge cycles, discharge profile, etc. These techniques may be combined with user behavioral heuristics. Also, a maintenance mode may be scheduled during an IHS's down time (e.g., turned off or sleeping), thus creating a low impact system maintenance schedule.

In some implementations, proactive fault avoidance techniques may include a self-contained intelligent maintenance mode scheduling, persistent tracking of telemetry across several or all states of an IHS (including low power states), self-contained OS agnostic sensor amalgamation, and self-contained OS agnostic trending algorithms.

E. Pre-Boot Self-Healing and Adaptive Fault Isolation

Conventional BIOSes are configured to halt the boot process upon detection of "no-boot" conditions. The inventors hereof have determined, however, that stopping the boot process altogether is not a good solution to many "no-boot" issues. Accordingly, systems and methods described herein may enable pre-boot self-healing processes performed at the BIOS level. In various implementations, these systems and methods may enable a BIOS to bypass failing devices and OPROMs, roll back user configuration, and/or invoke an OS-based recovery environment autonomously during the boot process.

Figure 4:
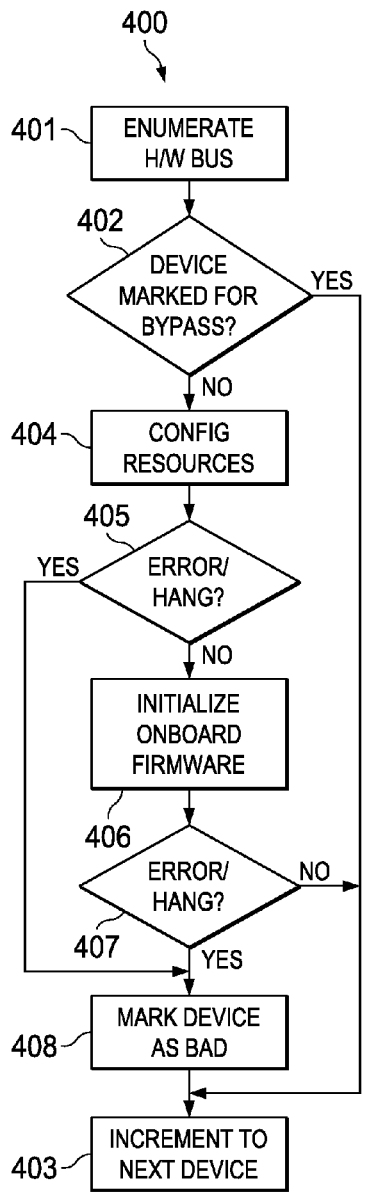
FIG. 4 is a flowchart of an example of a method for providing pre-boot self-healing according to some embodiments.

FIG. 4 is a flowchart of method 400 for providing pre-boot self-healing. In various embodiments, method 400 may be performed by BIOS 212 of IHS 200. Method 400 may employ a strike count for each device or module in the boot path, flag before and after device configuration steps to identify hangs, log devices that have caused a hang on previous boot attempt (e.g., in non-volatile memory), and bypass those devices in subsequent boot attempt.

Particularly, at block 401, method 400 may enumerate, identify, or list all hardware devices installed in the IHS on one or more buses. Examples of hardware devices include, but are not limited to, USB devices, PCI devices, HDDs, NICs, etc. Devices to be initiated sequentially during the boot process may be listed in a predetermined boot order and stored in NVM 301. At block 402, method 400 determines whether a given device on the list is marked for being bypassed. If so, block 403 increments to the next device listed in the boot order and bypasses the given device.

If the current device is not marked for bypass at block 402, then block 404 configures resources associated with that device and block 405 determines whether the configuration resulted in an error or hang condition. If so, block 408 marks the current device as potentially malfunctioning, and control passes to block 403.

If there is no error at block 405, then block 406 initializes onboard firmware for the current device. Then, block 407 determines whether the onboard firmware causes an error or hang condition. If not, control passes to block 403. Conversely, in response to the error, block 408 marks the current device as potentially malfunctioning and passes control to block 403.

In some implementations, a potentially malfunctioning device may be logged along with one or more diagnostic codes and stored, for example, in NVM 301 within BIOS 212. For instance, still referring to method 400, a first code may indicate that the device is subject to a configuration problem (as evaluated by block 405) and a second code may indicate that the device is subject to a firmware error. These codes may later be transmitted to a technical support service for further evaluation.

In various implementations, method 400 may be extended to save successful boot BIOS and device (HII) configurations to be restored incase of no boot, log all bypassed and rolled back configuration for a recovery environment, and/or disable as needed PCIe links, USB ports, external connections (e.g., docks, thunderbolt, type-C, etc.).

In some cases, BIOS 212 may store a configuration setting for a first device that results in a successful boot. Then, BIOS 212 may flag the first device in response to the configuration setting being modified. For example, configuration changes may be effected from within an OS environment, and BIOS 212 may detect those changes via the Advanced Configuration and Power Interface (ACPI). Additionally or alternatively, BIOS 212 may store a checksum of HII data on a successful boot, and then compare it to the failed boot. If they are equal, then no changes occurred—if they are different, however, then the configuration change may be determined to be the cause of the failure.

In response to the first device failing to boot after the modification, BIOS 212 may then restore the original configuration setting and attempt to boot again. If the subsequent attempt succeeds, it may be determined that the configuration change is likely the source of the no-boot condition.

Additionally or alternatively, BIOS 212 may include a table of devices to be booted and associated FRUs for each device. Once a device is tagged as a malfunctioning device, BIOS 212 may isolate the corresponding FRU and provide an indication of the FRU to a technical support service or the like.

In yet other cases, BIOS 212 may store a first boot order of the devices that results in a successful boot. In response to the predetermined boot order resulting in a no-boot condition, BIOS 212 may restore the first boot order and attempt to boot again.

Additionally or alternatively, BIOS 212 may associate a strike count with the devices, the strike count for each device representing a number of previous boot failures associated with that device. BIOS 212 may also provide the strike count to a technical support service for further evaluation, or to a primary or service OS.

Figure 5:
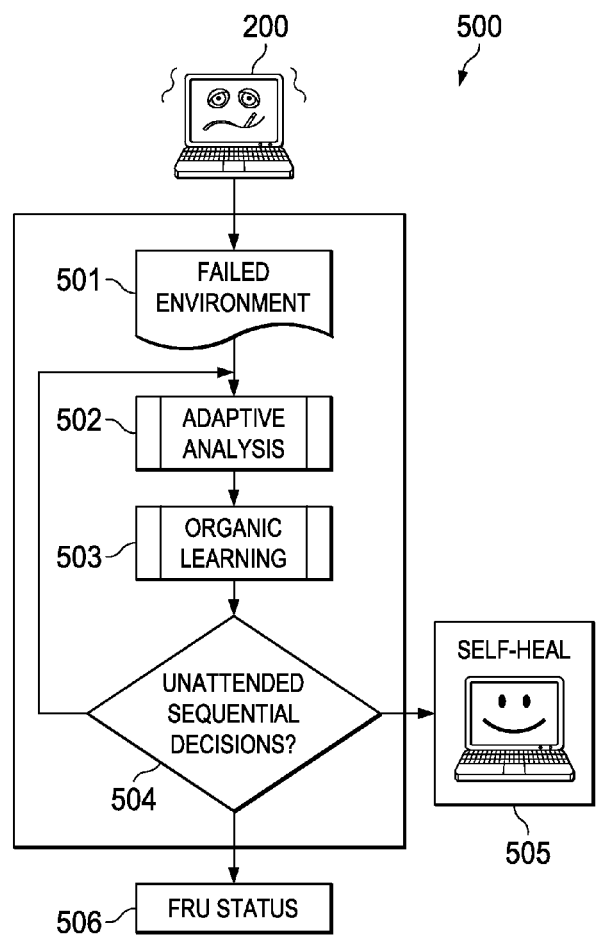
FIG. 5 is a flowchart of an example of a method for providing adaptive fault isolation according to some embodiments.

FIG. 5 is a flowchart of method 500 for providing adaptive fault isolation. In various embodiments, method 500 may be performed by BIOS 212 of IHS 200. Method 500 may preserve the fault environment, perform adaptive and deterministic analysis in a failed state, coalesce adaptive and learning capabilities, and employ unattended sequential decision making.

Specifically, at block 501, method 500 may identify and preserve a failed state, for example, by storing the contents of registers and/or memory at the time a no-boot situation is detected. At block 502, method 500 may perform an adaptive analysis operation. At block 503, method 500 may perform an organic learning operation. Then, at block 504, method 500 may perform one or more unattended sequential decisions, which if successful may result in self-healing block 505, and if unsuccessful may result in the identification of FRUs' statuses at block 506. Decisions made in block 504 may also be used by adaptive analysis block 504 to further refine its analysis. Moreover, blocks 501-506 may be performed autonomously and in the absence of user input.

To better explain the operations of FIGS. 4 and 5, consider the following hypothetical scenario where an IHS fails to boot. In this illustrative, non-limiting case, BIOS 212 may be made aware that an option ROM failed to load using method 400 at block 501. Still at block 501 BIOS 212 may also determine that the user has changed a configuration of the boot order. Additionally or alternatively, at block 501 BIOS 212 may determine that a shock event has taken place indicating a possible drop (as detected by an accelerometer within the IHS, not shown).

Then, as part of block 502, BIOS 212 may re-start the boot process with the offending OPROM mapped out, thus adapting through controlled failure environment changes. At block 503, assuming the boot path successfully passes the previous point of failure, BIOS 212 may verify the failure and narrow the possibilities through autonomous learning. At block 504, method 500 has three options: (a) check recent user configuration change, (b) check OPROM (code) integrity, or (c) check associated FRU health, and makes an autonomous decision on which path to take using sequential action.

For instance, BIOS 212 may check the OPROM code first, and determine that is less likely to have caused the failure. It may use a deterministic process to rule out platform FRUs, except the part associated with the OPROM, and it may then successfully isolate the FRU that has the highest likelihood to fail based on the conditions and environment present.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a Basic I/O System (BIOS) coupled to the processor, the BIOS having program instructions that, upon execution by the processor, cause the IHS to:
   initiate the booting of devices within the IHS following a predetermined boot order, wherein the predetermined boot order includes a first device followed by a second device;
   determine that the first device has been marked for bypass;
   bypass the booting of the first device; and
   boot the second device;
   associate a strike count with the devices, the strike count for each device representing a number of previous boot failures associated with that device; and
   provide the strike count to an Operating System (OS).

2. The IHS of claim 1, wherein the first device includes a Universal Serial Bus (USB) device, a Peripheral Component Interconnect (PCI) device, a Hard Disk Drive (HDD), or a Network Interface Card (NIC).

3. The IHS of claim 1, wherein the first device has been marked for bypass by the BIOS due to a previous attempt to boot the first device resulting in a failure.

4. The IHS of claim 3, wherein the previous attempt to boot the first device includes performing a failed firmware initialization operation for the first device.

5. The IHS of claim 3, wherein the previous attempt to boot the first device includes performing a failed device configuration operation for the first device.

6. The IHS of claim 3, wherein the program instructions, upon execution by the processor, further cause the IHS to:
   store a configuration setting for a first device that results in a successful boot;
   flag the first device in response to the configuration setting being modified; and
   in response to the first device failing to boot after the modification, restore the original configuration setting without input from any user.

7. The IHS of claim 6, wherein the flagging of the device occurs in response to the configuration setting being modified by a user within an Operating System (OS) environment.

8. The IHS of claim 3, wherein the program instructions, upon execution by the processor, further cause the IHS to:
   tag the first device as a malfunctioning device in response to a successful boot of subsequent devices;
   identify a Field Replaceable Unit (FRU) associated with the first device; and
   provide an indication of the FRU to a support service.

9. The IHS of claim 3, wherein the program instructions, upon execution by the processor, further cause the IHS to:
   store a first boot order of the devices that results in a successful boot; and
   in response to the predetermined boot order resulting in a no-boot condition, restore the first boot order without input from any user.

10. The IHS of claim 1, wherein the OS includes a primary Operating System.

11. The IHS of claim 1, wherein the OS includes a service Operating System.

12. A method, comprising:
    determining, by a Basic I/O System (BIOS) without any input from any user, that a given device in a boot order of an Information Handling System (IHS) has been marked for bypass as result of a previous, failed boot attempt;
    bypassing the given device in a current boot attempt;
    in response to the current boot attempt being successful, tagging the given device as a potentially malfunctioning device;
    associating a strike count with the given device, the strike count representing a number of boot failures caused by the given device; and
    providing the strike count to an Operating System (OS).

13. The method of claim 12, wherein bypassing the given device includes autonomously modifying the boot order by the BIOS without any input from any user.

14. The method of claim 12, further comprising:
    determining that an original configuration of the given device was changed between the previous, failed boot attempt, and an earlier successful boot attempt; and
    returning a current configuration of the given device to the original configuration.

15. The method of claim 12, further comprising identifying a Field Replaceable Unit (FRU) associated with the given device and providing an indication of the FRU to a support service.

16. A Basic I/O System (BIOS) having program instructions stored thereon that, upon execution by an Information Handling System (IHS), cause the IHS to:
    determine that a device in a boot order of the IHS has been marked for bypass as result of a previous, failed boot attempt;
    bypass the device in a boot attempt;
    in response to the boot attempt being successful, strike the given device as a potentially malfunctioning device;
    associate a strike count with the device, the strike count representing a number of strikes received by the device; and
    provide the strike count to an Operating System (OS).

17. The BIOS of claim 16, wherein the program instructions, upon execution by the IHS, further cause the IHS to:
    determine that an original configuration of the device was changed between an earlier successful boot attempt and the failed boot attempt;
    return the given device to its original configuration; and
    initiate another boot attempt.

18. The BIOS of claim 16, wherein the program instructions, upon execution by the IHS, further cause the IHS to:
    determine that an original boot order was changed between an earlier successful boot attempt and the failed boot attempt;
    return the boot order to the original boot order; and
    initiate another boot attempt.

* * * * *

UNITED STATES PATENT AND TRADEMARK OFFICE
CERTIFICATE OF CORRECTION

| | |
|---|---|
| PATENT NO. | : 9,734,015 B2 |
| APPLICATION NO. | : 14/747827 |
| DATED | : August 15, 2017 |
| INVENTOR(S) | : Herzi et al. |

Page 1 of 1

It is certified that error appears in the above-identified patent and that said Letters Patent is hereby corrected as shown below:

In Column 14, Line 42, Claim 16, delete "given".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*